United States Patent [19]

Seeler et al.

[11] Patent Number: 4,615,497
[45] Date of Patent: Oct. 7, 1986

[54] METHOD AND FLUTTER BRAKE FOR AN AIRCRAFT

[75] Inventors: Hartwig Seeler, Hamburg; Helmut Zimmermann, Syke, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 821,217

[22] Filed: Jan. 21, 1986

Related U.S. Application Data

[63] Continuation of Ser. No. 591,125, Mar. 19, 1984, abandoned.

[30] Foreign Application Priority Data

Mar. 23, 1983 [DE] Fed. Rep. of Germany ....... 3310510

[51] Int. Cl.$^4$ ............................................. B64C 13/16
[52] U.S. Cl. ................................. 244/75 A; 244/76 R
[58] Field of Search ................ 244/75 A, 75 R, 76 R, 244/76 B, 76 C, 199

[56] References Cited

U.S. PATENT DOCUMENTS

| 2,743,888 | 5/1956 | Lippisch | 244/199 |
| 2,745,613 | 5/1956 | Harpoothian et al. | 244/76 |
| 3,734,432 | 5/1973 | Low | 244/75 A |

FOREIGN PATENT DOCUMENTS

| 2349354 | 9/1976 | Fed. Rep. of Germany. |
| 1086938 | 10/1967 | United Kingdom. |

Primary Examiner—Trygve M. Blix
Assistant Examiner—Rodney Corl
Attorney, Agent, or Firm—W. G. Fasse; D. H. Kane, Jr.

[57] ABSTRACT

The invention relates to a method and an arrangement for the wings of a high speed aircraft, for increasing the flutter velocity. Aerodynamic auxiliary flaps or vortex generators are placed into an effective position in response to filtered sensor signals for causing a reduction in the local lift rise or for shifting the local neutral point toward the wing trailing edge to thereby provide an effective "flutter brake". The auxiliary flaps or vortex generators are activated only once when needed and stay in an activated effective position for a length of time sufficient for increasing the flutter velocity or speed and the activation takes place rapidly in about 200 to 400 milliseconds from the time the sensors pick up or provide a signal for such activation.

16 Claims, 7 Drawing Figures

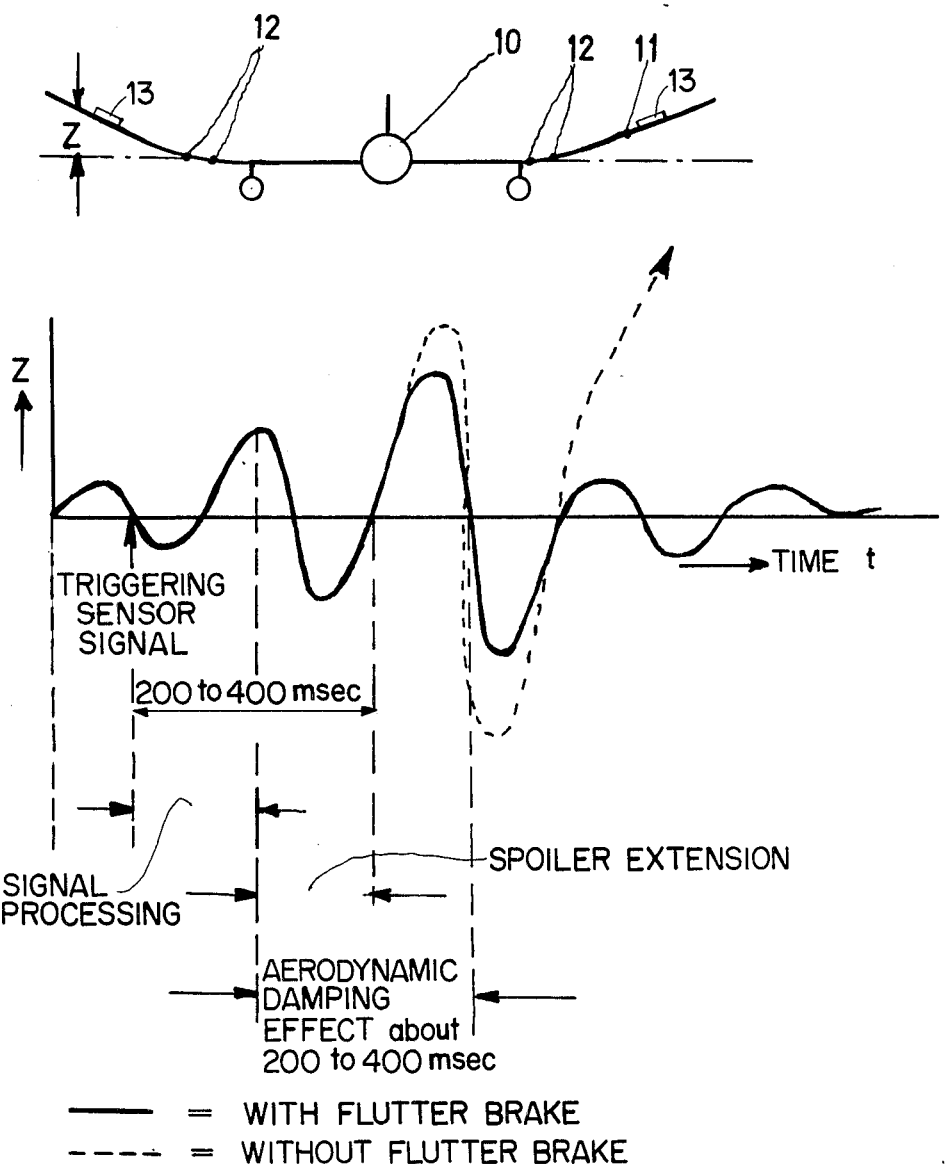

METHOD AND FLUTTER BRAKE FOR AN AIRCRAFT

This application is a Continuation, of application Ser. No.: 591,125, filed Mar. 1984, now abandoned.

FIELD OF THE INVENTION

The invention relates to a flutter brake for aircraft. Such a device increases the sensor detected flutter velocities of transonic aircraft wings or other airfoils which are subject to the danger of flutter. The invention also relates to a flutter reduction method.

DESCRIPTION OF THE PRIOR ART

The growing costs of fuel are leading to changes in the geometry of newly developed and modified airfoils or wings. However, such changes simultaneously lead to unacceptable unintended reductions in the critical flutter velocity of the airfoil or wing.

Special systems may be used to avoid the high additional weight otherwise required for strengthening of the structure. Until now it has been known to extend periodically activated rudders or flaps for preventing "fluttering". The problem at hand involves certain characteristic motion types of the elastic aircraft frame or cell which become increasingly less damped at increasing dynamic or impact pressures. These characteristic motion types arise at velocities greater than a critical velocity ($V_{crit}$). Normally, such fluttering leads to failure of the respective structure. Therefore, so-called flutter calculations are employed already during the construction, in order to solve this problem from the start by an increase in the structural stiffness and by changes in the construction itself.

An active flutter damping system has been used in high performance aircraft in order to increase the flutter velocity to a prescribed minimum level. This system which comprises sensors, controllers and adjusting elements, alters the characteristic behavior of the structure, in other words, such system achieves an artificial aerodynamic damping. Either ailerons or aileron-like devices on the airfoils or wings are used as adjusting elements, which are periodically moved at the characteristic frequency of the airfoil or wing, in order to achieve the aerodynamic damping effect. However, in such a system there is the danger of malfunction in that flutter motions may be increased due to phase errors rather than damped. In order to avoid increasing flutter motion with certainty, additional devices and measures must be provided.

OBJECTS OF THE INVENTION

In view of the above it is the aim of the invention to achieve the following objects singly or in combination:
to provide a positive and reliable flutter damping of an airfoil or wing;
such flutter damping shall be assured, especially in those cases in which fluttering arises without any system support at velocities of $V > V_{MO}$; and
to avoid stiffening features which merely increase the weight of the wing.

SUMMARY OF THE INVENTION

According to the invention an airfoil or aircraft wing is exposed to aerodynamic damping forces for the purposes of damping flutter movements by controlling the movement of aerodynamic auxiliary damping means such as spoiler flaps or vortex generators installed in or on a wing, in response to signals generated by sensor means providing a flutter representing value. Such sensors may be speed sensors which provide a control signal for the control of the damping means in response to a speed which exceeds a certain selectable threshold speed value. The sensors may be oscillation or vibration sensors which provide the respective control signal for the damping means in response to an oscillation or vibration level which exceeds in its amplitude or frequency a selectable threshold amplitude or frequency value. These threshold values signal or anticipate an onset of flutter. The damping means are then maintained stationary in the damping position until the undesired flutter causing instability has been damped sufficiently or until the aircraft speed is reduced to a level below the threshold or critical level. At that point the damping means are rendered ineffective either automatically or manually. According to the invention the damping means are not moved repeatedly for the same flutter situation. The just mentioned speed sensors and the oscillation sensors, as well as the means for adjusting the position of spoiler flaps and/or flaps constituting vortex generators are known in the art.

BRIEF FIGURE DESCRIPTION

In order that the invention may be clearly understood, it will now be described, by way of example, with reference to the accompanying drawings, wherein:

FIG. 1 is a schematic front view of an aircraft with an airfoil or wing subject to a flutter deflection "Z" shown in a somewhat exaggerated way;

FIG. 2 is a diagram of the wing movement or flutter deflection "Z" as a function of time, whereby the full line curve represents the aerodynamic damping by means of a flutter brake according to the invention while the dashed line curve shows the flutter deflection without such a flutter brake;

Figure 3:
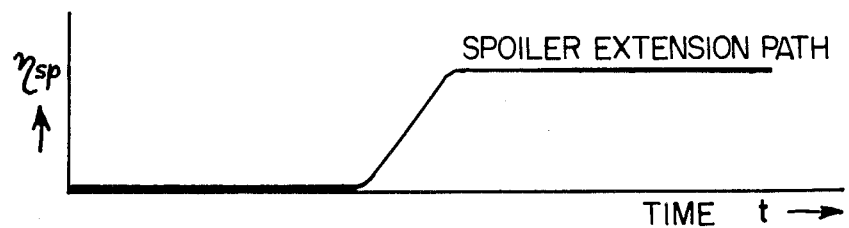
FIG. 3 is a diagram of the spoiler extension path after exceeding structural acceleration limits as a function of time.
Figure 4:
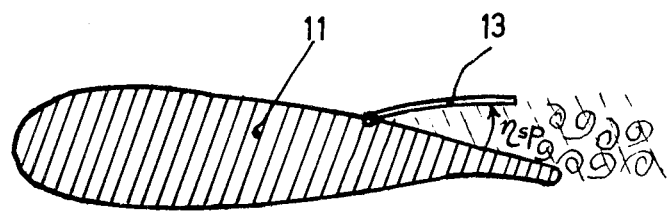
FIG. 4 is a schematic cross-section of a wing profile with an extended spoiler flap.
Figure 5:
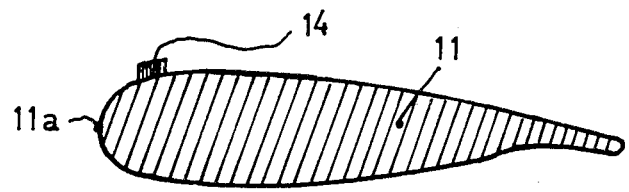
FIG. 5 is a schematic cross-section of a wing profile with extended vortex generator means.

DETAILED DESCRIPTION OF PREFERRED EXAMPLE EMBODIMENTS AND OF THE BEST MODE OF THE INVENTION

In high performance aircraft, the so-called transonic airfoils or wings possess a well defined flutter velocity minimum. Experience has shown that this minimum lies near the Mach number for which the airfoil wing has been designed and is known as the "transonic dip". The cause of the rising of the flutter velocity at Mach numbers higher than the design Mach number may largely be explained by the altered course of the local, stationary lift increases and/or by the stationary, local neutral points, or rather by the distribution of these parameters along the wing span width. The invention employs this effect, and alters or modifies the local lift increases and/or the neutral point positions, by means of spoiler flaps 13 or vortex generators 14, at the onset of or in response to a flutter instability. This alteration is achieved in a stationary or steady manner, whereby a desired increase of the flutter velocity results. These damping means 13, 14 are not moved repeatedly.

When using spoiler flaps 13, relatively small extension angles $\eta_{sp}$ in the range of 5° to 15° have been found to be sufficient. One condition must be met, however, namely the prompt recognition of the flutter instability and the correction must become effective sufficiently quickly. A correction is sufficiently fast if the sensors 12 have achieved the desired control of the aerodynamic auxiliary means, such as the spoiler flaps 13 or vortex generators 14, within a time interval of approximately 200 to 400 msec after release of a control signal.

Alternatively, the extension or operation of appropriate aerodynamic auxiliary damping means 13, 14 may be performed more slowly by means of a velocity signal at velocities above $V_{MO}$, in such a manner that the velocity span or range or difference between $V_{MO}$ and $V_D$, or between $M_{MO}$ and $M_D$, is reduced, and that at constant velocities $V_{MO}$, smaller velocities $V_D$ or $M_D$ are achieved. $V_{MO}$ is the maximum operating speed. $V_D$ is the design dive speed. $M_{MO}$ is the maximum operating Mach number. $M_D$ is the design dive Mach number. In the existing construction regulations for aircraft (FAR), it is required that commercial aircraft must remain flutterfree up to velocities of 1.2 $V_D$, that is $$V_{crit} \geq V_D > V_{MO} \geq V_C \ (V_C = \text{cruising speed}).$$

The suggested features of the invention are thus intended primarily for such aircraft concepts in which the fluttering arises without system support at velocities $V > V_{MO}$. In cruising flight, the increase in resistance due to the extension of spoilers would be intolerable; whereas at velocities above $V_{MO}$ and especially above $V_D$, such resistance changes do not have any further economical disadvantages.

In order to sense accelerations of the wing structure which cause flutter oscillations or motions, sensors 12 are arranged in those areas of the wing or wings in which the oscillation antinodes of the flutter motions are expected to occur. The signal of these transmitters or sensors 12 is then filtered so that only oscillations having frequencies within the frequency band of the expected flutter motions may pass through the filter. Since the frequencies of the flutter motions are known or measurable, constructing the respective pass filter is then conventional. When a given threshold acceleration wave or a given velocity limit is exceeded, the spoilers 13 or the vortex generators 14, or similar aerodynamic auxiliary means are operated to cause the above mentioned damping. In particular, the spoilers 13 are arranged symmetrically in both wings on both sides of the aircraft as shown in FIG. 1, especially the spoilers 13 are located near the wing tips. The resulting so-called "dead water" spoils the air-flow conditions at the trailing edge of the wing in the sense of a reduced or smaller lift rise of the airfoil or wing area near the spoiler 13. After a delay time of approximately 10 msec the newly achieved flow condition has stabilized and the flutter motions—as far as any may already have existed—fade out. The retraction of the spoiler flaps 13 or of the vortex generators 14 shown in FIG. 6 may be achieved through manual operation by the pilot, or automatically after the reduction of the flight velocity by a prescribed value $\Delta V_1$, or as a function of a prescribed limit or threshold velocity.

Figure 6:
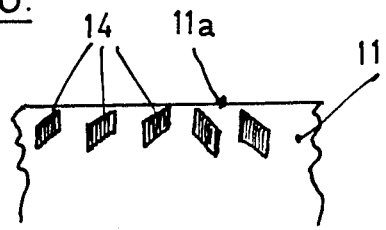
FIG. 6 is a partial top view onto the arrangement of vortex generators in the wing leading edge.

In an arrangement of vortex generators 14 or the like, it is suggested that these vortex generators be placed inside the wing in the area of the wing leading edge 11a as shown in FIG. 6 since in this position the vortex generators 14 reduce the pressure peaks on the wing's upper surface in the leading edge zone. This reduction diminishes the lift gradient and further displaces the local neutral point rearwardly. These last mentioned vortex generators 14 must be matched to the particular profile type of the wing 11. The dimensions of the vortex generators are ascertained by wind tunnel tests. The vortex generators 14 are air guide vanes which are adjustable in their position by movement into and out of the wings by conventional control means between an effective vortex causing position outside the wing and an ineffective position inside the wing. Such control means may be basically the same as those used for moving the spoilers 13.

The described steps and features provide an optimal increase of the flutter velocity of high performance aircraft by means of the simple function of a one-time extension or operation of a flutter brake which is then held open for a sufficient period of time. Contrary thereto, in the prior art the flutter limits are increased by means of periodically moved aerodynamic rudders or flaps.

Figure 7:
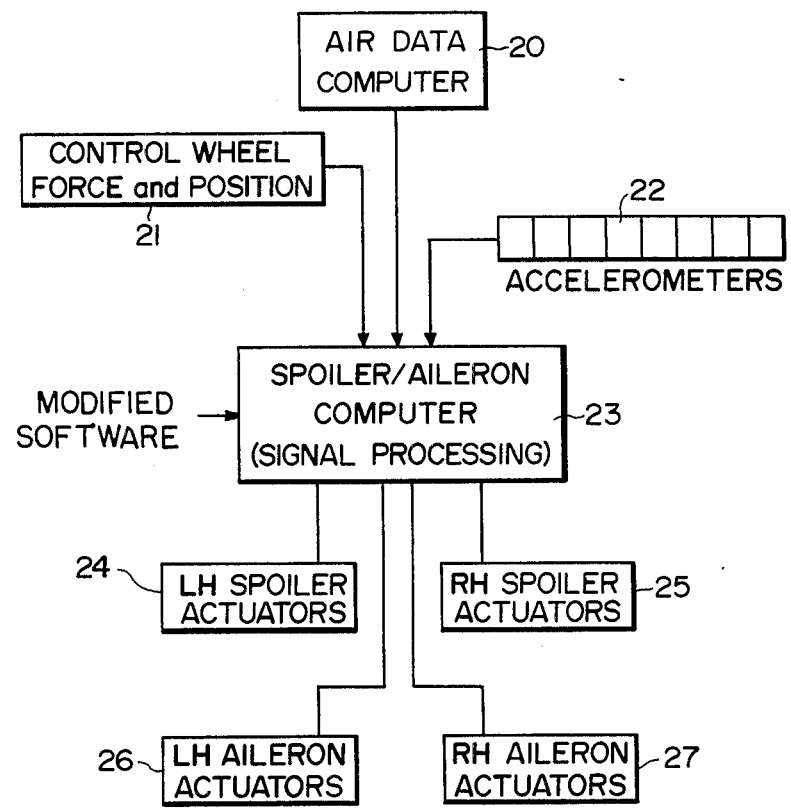
FIG. 7 illustrates in a block diagram of the present spoiler function integrated into an existing lateral control system.

As shown in FIG. 7, available sensor signals representing speed information from an air data computer 20, for example, or signals from specially provided accelerometers 22 installed in the wings and/or fuselage may be used for the present purposes. These signals including control force and position representing signals 21 coming from the steering column or wheel, are supplied to the spoiler/aileron computer 23 which then operates the left-hand and right-hand spoiler actuators 24, 25 and the left-hand and right-hand aileron actuators 26, 27. The spoiler/aileron computer 23 is a conventional electronic flight control unit and may be provided with modified software for additional control functions for a symmetrical spoiler actuation at predetermined speeds or accelerations. Such modified software could provide a low pass filter for the speed signal, if that should not be available already in the air data computer. A band filter could be realized by appropriate software elements for the acceleration signal or signals. Existing spoilers and their actuator system can be used for the present purpose with no or only minor modifications. If specially provided aerodynamic devices are used, they could be actuated by either conventional hydraulic actuators operated through electrical signals or by purely electrical actuation systems for operating the spoilers/ailerons as taught by the invention.

Although the invention has been described with reference to specific example embodiments, it will be appreciated that it is intended to cover all modifications and equivalents within the scope of the appended claims.

What is claimed is:

1. A method for increasing the flutter velocity or speed of an aircraft comprising the following steps:
   (a) sensing a threshold signal anticipating an onset of an instability causable by flutter,
   (b) processing the sensed threshold signal for providing a control signal representing an anticipated onset of an instability causable by flutter,
   (c) automatically placing aerodynamic damping means (13, 14) in response to said control signal into a stationary operative position for modifying local lift increases at said onset of a flutter instability, (d) holding said aerodynamic damping means in said operative, stationary position for a length of time sufficient to reduce said flutter instability to a desired level by an increase in the flutter velocity, and (e) returning said aerodynamic damping means into an inoperative position when said sufficient time has elapsed and said flutter instability has been reduced to said desired level, whereby said aerodynamic damping means are not moved repeatedly for the same flutter situation.

2. The method of claim 1, wherein said sensing involves sensing an aircraft speed at which said flutter caused instability begins.

3. The method of claim 2, wherein said sensing involves sensing a predetermined limit speed or a limit Mach number.

4. The method of claim 1, wherein said sensing involves sensing a predetermined vibration value of a vibration caused by the onset of flutter.

5. The method of claim 4, wherein said vibration value is a vibration amplitude.

6. The method of claim 4, wherein said vibration value is a vibration frequency.

7. The method of claim 1, comprising using as said aerodynamic damping means spoiler flaps (13) which are arranged symmetrically in each aircraft wing, said spoiler flaps being movable out of and back into the wing surface, especially the upper wing surface.

8. The method of claim 1, comprising using as said aerodynamic damping means vortex generators (14) arranged inside a wing alongside a wing leading edge, said vortex generators being movable out of and back into the wing surface.

9. The method of claim 1, wherein said step of automatically placing involves a time duration of about 200 to 400 milliseconds.

10. The method of claim 1, wherein said sufficient length of time is within the range of about 200 to 400 milliseconds.

11. An apparatus for increasing the flutter velocity or speed of an aircraft, comprising sensing means for sensing a threshold signal anticipating an onset of an instability causable by flutter, signal processing means operatively connected to said sensing means for producing of the sensed threshold signal a control signal representing an anticipated onset of a flutter instability, aerodynamic damping means (13, 14), operating means operatively connected to said signal processing means and to said damping means (13, 14) for automatically placing said damping means (13, 14) in response to said control signal into a stationary operative position and for holding said damping means (13, 14) in said stationary operative position for a length of time sufficient to reduce said flutter instability to a desired level, and for returning said aerodynamic damping means into an inoperative position when said sufficient time has elapsed and said flutter instability has been reduced to said desired level, whereby said aerodynamic damping means are not moved repeatedly for the same flutter situation.

12. The apparatus of claim 11, wherein said sensing means comprise speed sensing means for sensing an aircraft speed at which said flutter caused instability begins.

13. The apparatus of claim 11, wherein said sensing means comprise vibration value sensing means.

14. The apparatus of claim 11, wherein said aerodynamic damping means comprise spoiler flaps (13) which are arranged symmetrically in each aircraft wing, said spoiler flaps being movable out of and back into the wing surface, especially the upper wing surface.

15. The apparatus of claim 11, wherein said aerodynamic damping means comprise vortex generators (14) arranged inside a wing alongside a wing leading edge, said vortex generators being movable out of and back into the wing surface.

16. The apparatus of claim 13, wherein said operating means are automatically effective within a time duration of about 200 to 400 milliseconds for placing said damping means (13, 14) into an effective position.

* * * * *